United States Patent [19]

Hatas

[11] Patent Number: 5,224,723
[45] Date of Patent: Jul. 6, 1993

[54] VEHICLE STEP AND PLATFORM APPARATUS

[76] Inventor: Peter J. Hatas, 2223 Robinwood Ave., Toledo, Ohio 43620-1020

[21] Appl. No.: 888,209

[22] Filed: May 26, 1992

[51] Int. Cl.⁵ .............................................. B60R 3/02
[52] U.S. Cl. ................................. 280/166; 105/447; 414/541; 414/921
[58] Field of Search .................. 280/166, 163, 164.1, 280/169; 187/9 R; 105/447, 448, 443; 414/541, 542, 921; 182/127, 91, 85, 86

[56] References Cited

U.S. PATENT DOCUMENTS

| | | | |
|---|---|---|---|
| Re. 33,595 | 5/1991 | Sullivan et al. | 187/9 R |
| 3,888,463 | 6/1975 | O'Brien et al. | 254/10 C |
| 4,005,788 | 2/1977 | Ratliff | 414/471 |
| 4,027,807 | 6/1977 | Thorley | 280/166 |
| 4,056,203 | 11/1977 | Meldahl et al. | 214/75 T |
| 4,081,091 | 3/1978 | Thorley | 414/545 |
| 4,124,096 | 11/1978 | Dudynskyj et al. | 187/9 R |
| 4,124,097 | 11/1978 | Hawks et al. | 187/9 R |
| 4,124,098 | 11/1978 | Dudynskyj | 187/9 R |
| 4,124,100 | 11/1978 | Hawks | 187/9 R |
| 4,124,130 | 11/1978 | Rohrs et al. | 414/539 |
| 4,164,292 | 8/1979 | Karkau | 414/545 |
| 4,168,134 | 9/1979 | Pohl | 414/545 |
| 4,176,999 | 12/1979 | Thorley | 414/540 |
| 4,180,366 | 12/1979 | Roth et al. | 414/540 |
| 4,219,104 | 8/1980 | MacLeod | 187/9 R |
| 4,251,179 | 2/1981 | Thorley | 414/545 |
| 4,270,630 | 6/1981 | Karkau | 187/9 R |
| 4,273,217 | 6/1981 | Kajita | 187/9 R |
| 4,285,416 | 8/1981 | Dudynskyj | 187/9 R |
| 4,325,576 | 4/1982 | Guthrie | 296/65 R |
| 4,344,508 | 8/1982 | Peck | 187/9 R |
| 4,381,899 | 5/1983 | Merkle | 414/556 |
| 4,392,771 | 7/1983 | Smalley | 414/545 |
| 4,420,286 | 12/1983 | Hanson et al. | 414/539 |
| 4,441,850 | 4/1984 | Thorley | 414/545 |
| 4,442,921 | 4/1984 | Sherman | 187/8.52 |
| 4,457,402 | 7/1984 | Del Vecchio et al. | 187/12 |
| 4,466,771 | 8/1984 | Thorley et al. | 414/787 |
| 4,474,527 | 10/1984 | Risner et al. | 414/540 |
| 4,479,753 | 10/1984 | Thorley | 414/541 |
| 4,480,719 | 11/1984 | Risner | 187/8.52 |
| 4,551,056 | 11/1985 | Risner | 414/539 |
| 4,551,060 | 11/1985 | Quercy | 414/541 |
| 4,556,128 | 12/1985 | Thorley et al. | 187/9 R |
| 4,576,539 | 3/1986 | Williams | 414/391 |
| 4,583,466 | 4/1986 | Reddy et al. | 105/447 |
| 4,606,433 | 8/1986 | Smalley et al. | 187/9 R |
| 4,664,584 | 5/1987 | Braun et al. | 414/541 |
| 4,685,858 | 8/1987 | Manning et al. | 414/537 |
| 4,718,812 | 1/1988 | Smalley et al. | 414/540 |
| 4,759,682 | 7/1988 | Hood | 414/537 |
| 4,804,308 | 2/1989 | Hamblin et al. | 414/540 |
| 4,808,056 | 2/1989 | Oshima | 414/462 |
| 4,909,700 | 3/1990 | Fontecchio et al. | 414/549 |
| 4,953,665 | 9/1990 | Paquin | 187/9 R |
| 4,966,516 | 10/1990 | Vartanian | 414/537 |
| 5,026,244 | 6/1991 | Dorn | 414/540 |
| 5,040,936 | 8/1991 | Rhea | 414/540 |
| 5,052,521 | 10/1991 | Wendt et al. | 187/12 |

FOREIGN PATENT DOCUMENTS

2140749A 12/1984 United Kingdom .

*Primary Examiner*—Richard M. Camby
*Attorney, Agent, or Firm*—Willian Brinks Olds Hofer Gilson & Lione

[57] ABSTRACT

A passenger lift system for mobile vehicular use which functions either as a retractable step system for the vehicle or as a vertically movable elevator platform for non-ambulatory passengers transporting non-ambulatory passengers from an upper position level with the vehicle to a lower position at ground level. The lift system includes a vertical safety barrier at the outermost edge of the platform which, when not in use, collapses to form the lowermost step in the step system. The lift is moved by hydraulic actuated motors or electro-mechanical devices, or the like, whose operation and motive power is independent of the vehicles propulsion system and is controlled by appropriate electrical sensors which detect and correct any malfunction thereof.

5 Claims, 8 Drawing Sheets

VEHICLE STEP AND PLATFORM APPARATUS

BACKGROUND OF THE INVENTION

This invention relates to a passenger lift system for mobile vehicular use such as in commercial buses and vans in which the lift system functions either as a retractable step system or a vertically movable platform for non-ambulatory passengers. The lift system includes a vertical safety barrier at the outermost edge of the platform which, when not in use, collapses to form the lowermost step in the step system. The lift is moved by hydraulically actuated motors or electro-mechanical devices or the like, whose operation is dependent upon the vehicle's propulsion system and is controlled appropriate electrical sensors which detect and correct any malfunction.

BACKGROUND OF THE INVENTION

There are a number of devices which have been proposed or actually built for assisting non-ambulatory persons in the ingress and egress from vehicles, particularly commercial buses. Such systems may include elevators or platforms which move from the street level to the floor level of the vehicle, and transport non-ambulatory persons such as those sitting in a wheelchair or other means of transportation into and out of the vehicle. Such systems must be reliable, simple to operate by the bus driver and foolproof in that they cannot stall or otherwise endanger the person being assisted into the vehicle.

OBJECTS OF THE INVENTION

It is accordingly an object of this invention to provide a wheelchair lift for vehicles to facilitate ingress and egress by non-ambulatory persons in which a plurality of rectangular steps are pivotally connected together at their longitudinal edges and can be orientated in either a retracted position as steps or an extended position in a horizontal platform. In the retracted position, the step sections are alternately horizontally and vertically aligned to form conventional steps. In extended positions, the step sections are horizontally aligned to form a platform which is moved upwardly and downwardly.

There are a number of United States patents which disclose and claim various features of wheelchair lifts of the type previously described in which folding steps may be extended to form a horizontal platform. Exemplary of these patents are U.S. Pat. No. 4,466,771 issued Aug. 21, 1984; U.S. Pat. No. 4,441,850 issued Apr. 10, 1984; U.S. Pat. No. 4,251,179 issued Feb. 17, 1981; U.S. Pat. No. 4,176,999 issued Dec. 4, 1979; U.S. Pat. No. 4,081,091 issued Mar. 28, 1978 and U.S. Pat. No. 4,027,807 issued Jun. 7, 1977.

In each of these instances, the lift is shown as a movable platform and/or stair extending between the level of a bus floor and the ground level and positioned to one side of the bus if installed in a normally located bus front or rear door. By various mechanisms the steps, which are generally rectangular sections hinged together at their adjacent longer sides, form successive steps and risers and can be extended horizontally outward to form a platform which in turn can be raised and lowered from the level of the bus floor. At that point the wheelchair is loaded onto the platform and then lowered to the ground level at which point the wheelchair is driven off the platform onto the ground. Each of the prior art examples heretofore discussed contains various methods of empowering the interlocks and accomplishing the mechanical functions of these devices.

SUMMARY OF THE INVENTION

It is accordingly an object of this invention to provide a passenger lift of the type described which functions either as a retractable step system for a vehicle or as a vertically movable elevated platform for transporting non-ambulatory passengers from an upper position level with the vehicle floor to a lower position at ground level. The lift system of this invention includes a safety barrier at the outermost edge of the platform which, when not in use, collapses to form the lowermost step of the system. The lift is powered by hydraulically actuated motors or electro-mechanical devices or the like, whose operation and motive power are dependent upon the main vehicle's propulsion system and is controlled by appropriate electrical controls operated by the bus operator.

A particular advantage of this application is the way in which the platform is moved from an upper to a lower position by means of a chain and extensible piston mechanism which, because of its way of attachment, allows for movement of the platform over a relatively large vertical distance by an extensible piston of relatively small stroke.

Other objects and advantages of the invention will be apparent to those skilled in the art from the following detailed description of a preferred embodiment thereof, with reference being made to the accompanying drawings.

DETAILED DESCRIPTION OF THE INVENTION

Figures 1, 2:
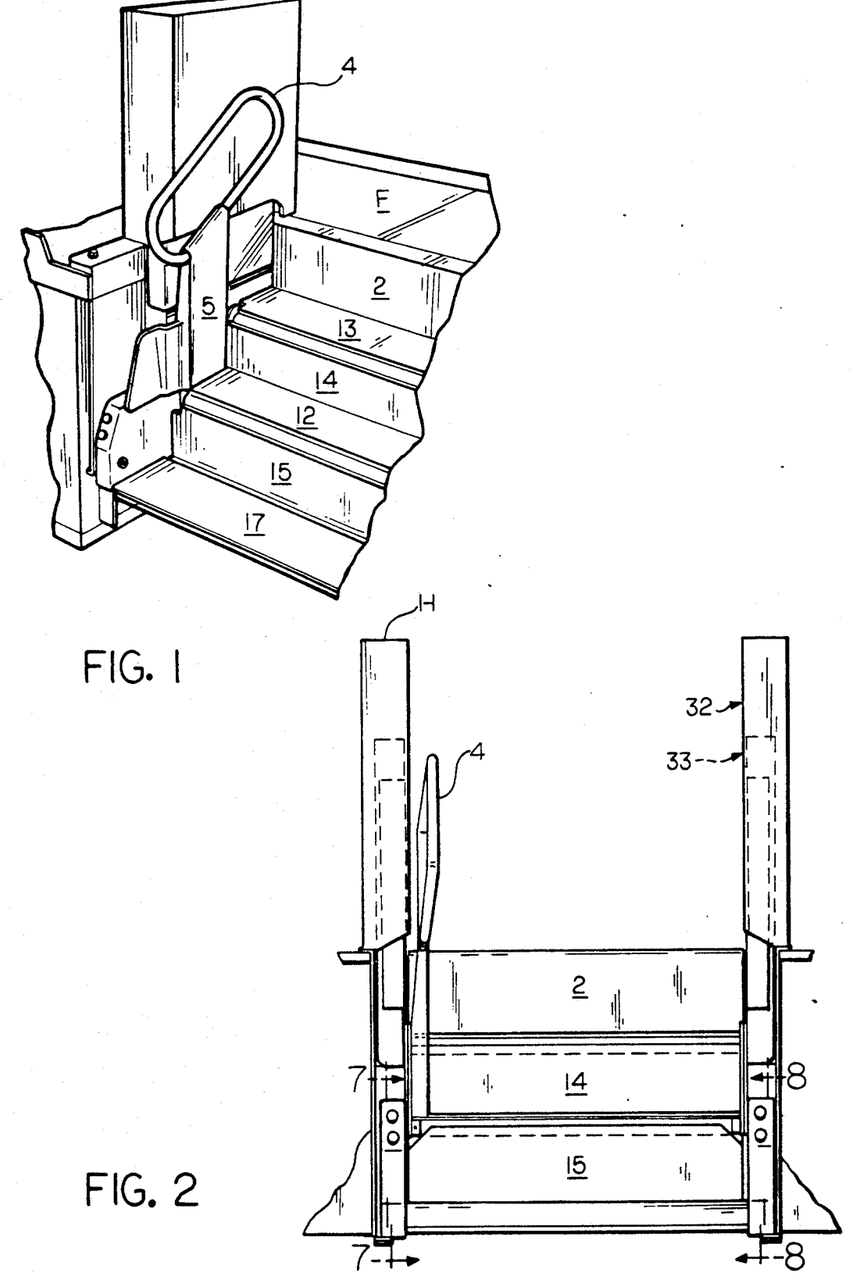
FIG. 1 is a fragmentary perspective view of a vehicle showing the passenger lift system of the present invention where the apparatus is illustrated as being in the step-like stowed position.
FIG. 2 is a front elevational view of the present invention where the apparatus is illustrated as being in the step-like stowed position.

Referring first to FIG. 1, the steplift of this invention is shown in perspective, partially broken away, as it would appear at the side door of a bus or van and in its stowed position. It includes an outer or main frame housing H (only one of which is shown) secured relative to the bus floor F and extending upwardly within the bus compartment. The steps themselves include a middle step 12 and a lower step 17, separated by a lower riser 15, with an upper riser 14 connecting the middle step 12 with an upper step 13. The vertical member extending from the floor F, designated by reference numeral 2, forms in effect a top riser when the steps are in the position shown in this figure. On each side of the steps is a handrail 4 which may be of any suitable shape and is supported by a vertical brace 5 which is secured to either side of the path of the steps 12, 13 and 17 as will be later seen in the detailed description.

Figure 3:
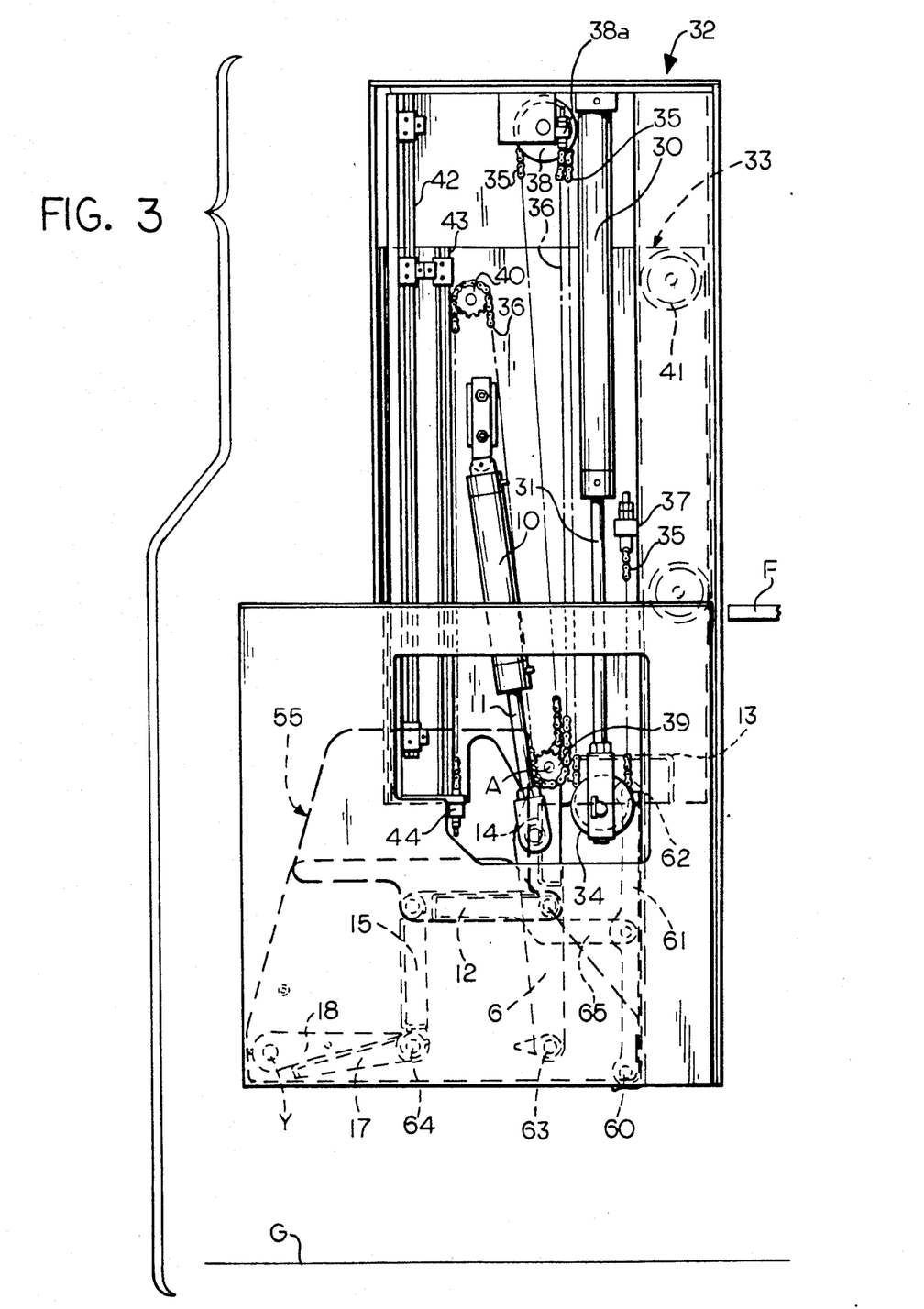
FIG. 3 is a side elevation of the passenger lift system of the present invention where the steps are in their step-like position.
Figure 4:
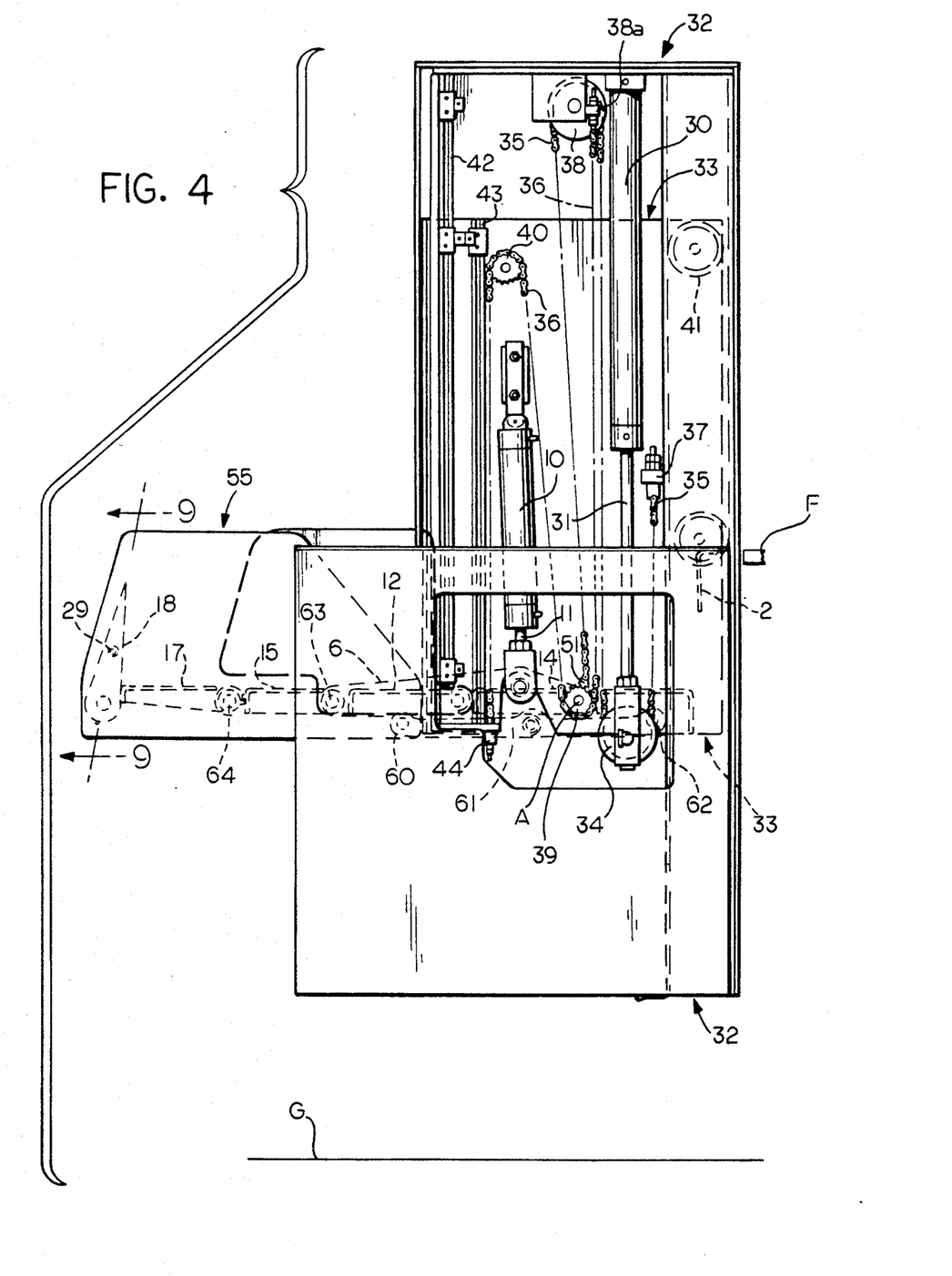
FIG. 4 is a side elevation similar to that of FIG. 3 but with the steps extending to form the horizontal platform at an intermediate elevation.
Figure 5:
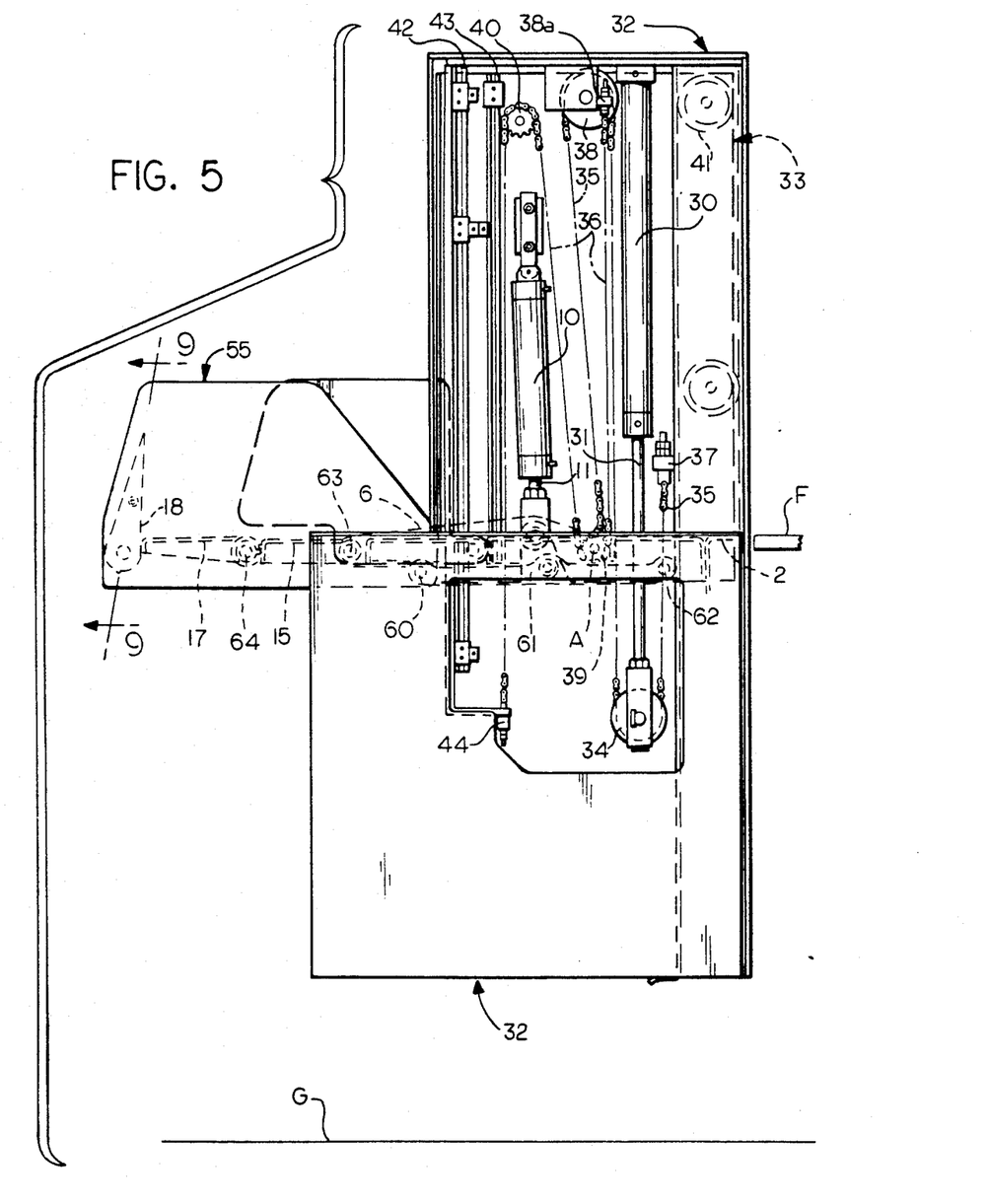
FIG. 5 is a side elevation similar to that of FIG. 4 but with the platform moved upwardly to a horizontal position even with the bus floor.
Figure 6:
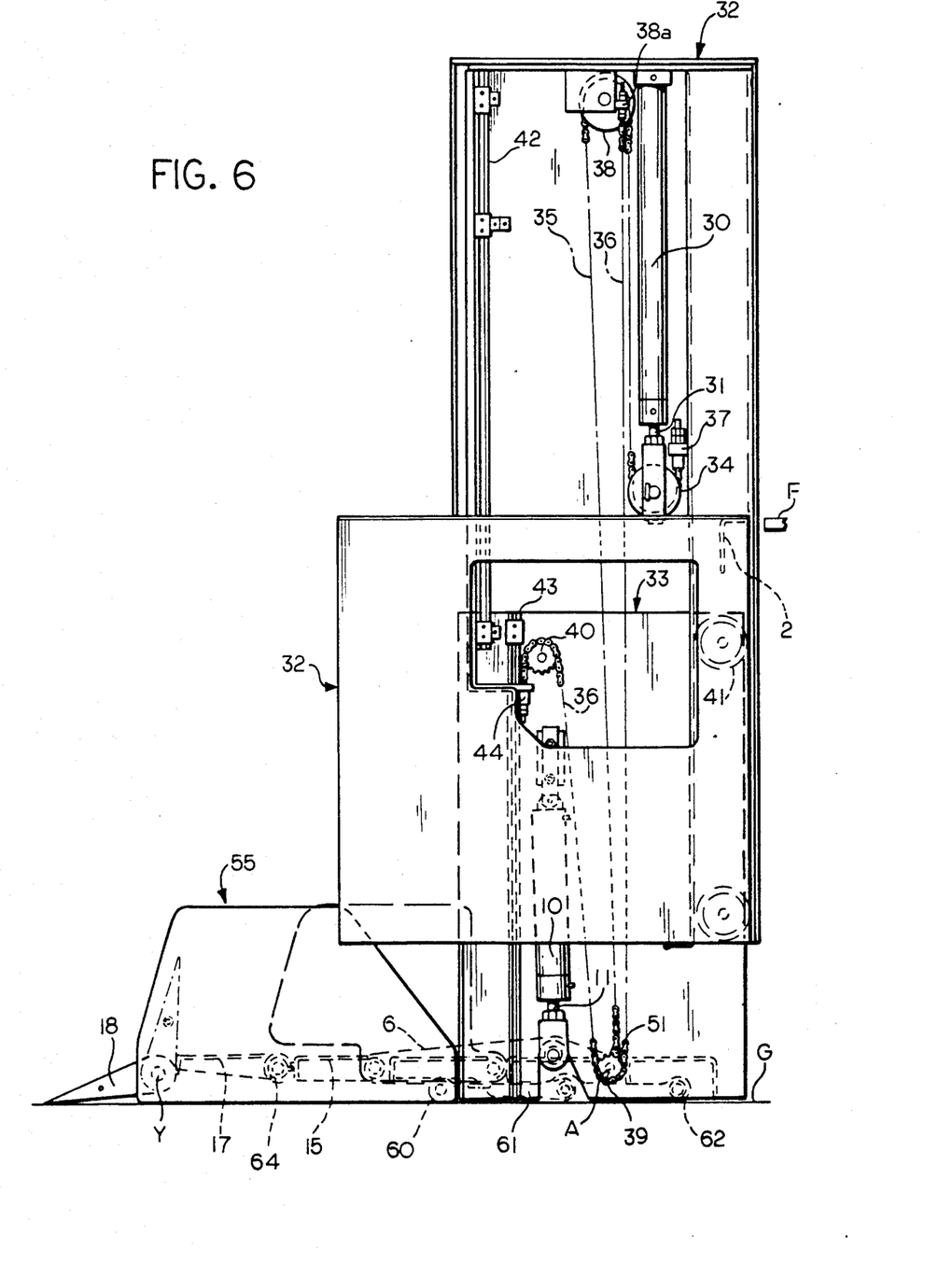
FIG. 6 is a side elevation similar to that of FIG. 5 but with the platform in its lowermost position at ground level, and also illustrating the safety barrier in its downward or ramp-like position shown in solid line and in its upper safety barrier position in broken line.

In general, the following description describes the mechanism for moving and the sequence of moving the steps from their stowed position as shown in FIG. 1 and also shown in greater detail in FIG. 3 to an intermediate elevated position in which the steps have been extended to form a horizontal platform as shown in FIG. 4. From this intermediate extended position the steps are then moved upwardly to a horizontal position even with the bus floor F as shown in FIG. 5. In this position, the horizontal platform is held at the same level as the bus floor F and the person embarking on the platform in a wheelchair or otherwise can easily translate from the bus floor to the platform. The lift then moves to its lowermost extended position as shown in FIG. 6, with the person being carried now at ground level and waiting for the barrier 18 to move from its upward locked safety position to its horizontal position where it functions as a ramp from the platform to the ground. The sequence of this operation will now be described in more detail with reference being made to the drawings mentioned above which describe the details of the mechanism for moving the steps through their cycle.

Referring to FIG. 3, the steplift is shown in the so-called stow position with the step members folded in step position with two risers 14 and 15 separating the steps 12, 13, and 17. The outside of the inner section of the mechanism for moving the steps through their cycle is a trapezoidal frame 55 seen in FIGS. 6-8. Secured relative to that trapezoidal frame 55 and extending through it are the bottom end 60 of a link 61 which is pivotally attached to the upper step 13 at 62. Also secured to the trapezoidal frame 55 is the bottom end 63 of a link 6, and also secured relative to the trapezoidal frame 55 is the bottom end 64 of riser 15.

Referring to FIG. 3, to start raising the step members to form a horizontal platform, a hydraulic cylinder and piston combination 10 and 11 having their upper end secured as by bolts to the inner frame 33 is retracted and its retraction causes link 6, which is attached to link 61 through another link 65, to pivot (clockwise in FIG. 3) about pivot point A. This causes link 61 to follow link 6 in pivoting in a clockwise direction. As these two links (61 and 6) pivot together in a clockwise direction, their lower fixed ends 60 and 63 cause the trapezoidal frame 55 to translate upwardly and forwardly. This movement of trapezoidal frame 55 causes the bottom end 64 of riser 15 to move in an upward and outward direction, thus pivoting the lower riser 15 in a clockwise direction around its upper pivot point relative to middle step 12 until the lower riser 15 reaches a horizontal position. This movement of the trapezoidal frame 55 also causes the middle step 12 to move upwardly and outwardly as it is pivoted in the middle of link 6. At the same time, the upper riser 14, which is pivotally attached to the lower end of piston 11, is pivoted about pivot point A towards a horizontal position. As the lower riser 15 moves or pivots clockwise towards a horizontal position, the lowermost step 17 falls by gravity to a horizontal position. The barrier 18 is not carried by the lower step 17 but operates independently and will be subsequently described.

Referring to FIG. 4, the entire platform is now in horizontal position with link 6 horizontal at the level of pivot point A, and with link 61 horizontal at the level of its pivot point 62 which is slightly below pivot point A so that the two links 61 and 6 are both horizontal and closely adjacent to each other. The various steps and riser members have now reached their horizontal position and link 6 has come to rest in horizontal position outside of the steps and risers. The platform is now horizontal and the barrier 18 is in its vertical safety barrier position. This detail is best shown in FIG. 9 which shows section 9—9 from FIG. 4 or FIG. 5.

Figure 9:
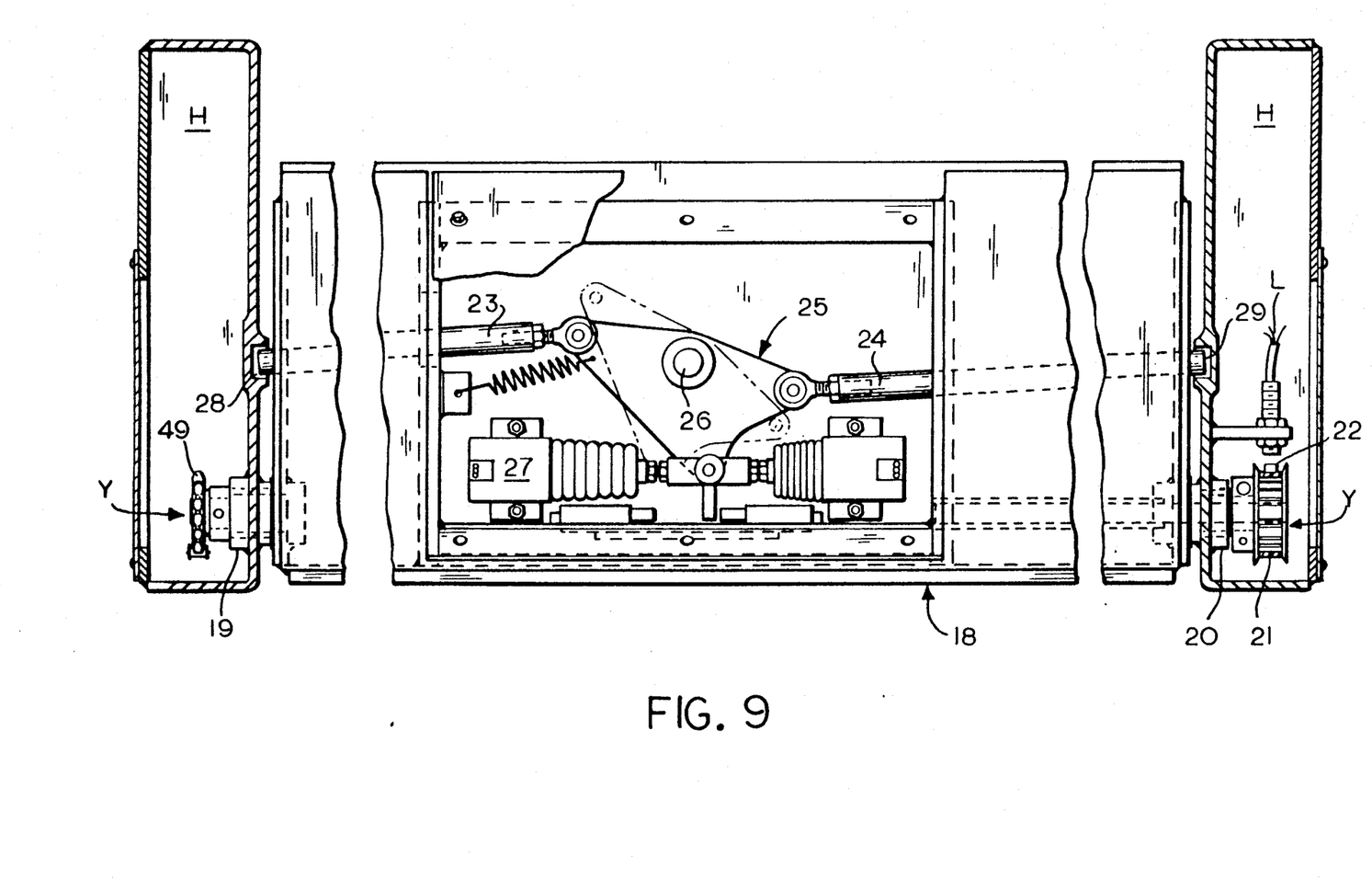
FIG. 9 is a detailed side elevation taken along line 9—9 of FIG. 4 or FIG. 5 and illustrating the safety barrier locking mechanism.
Figure 10:
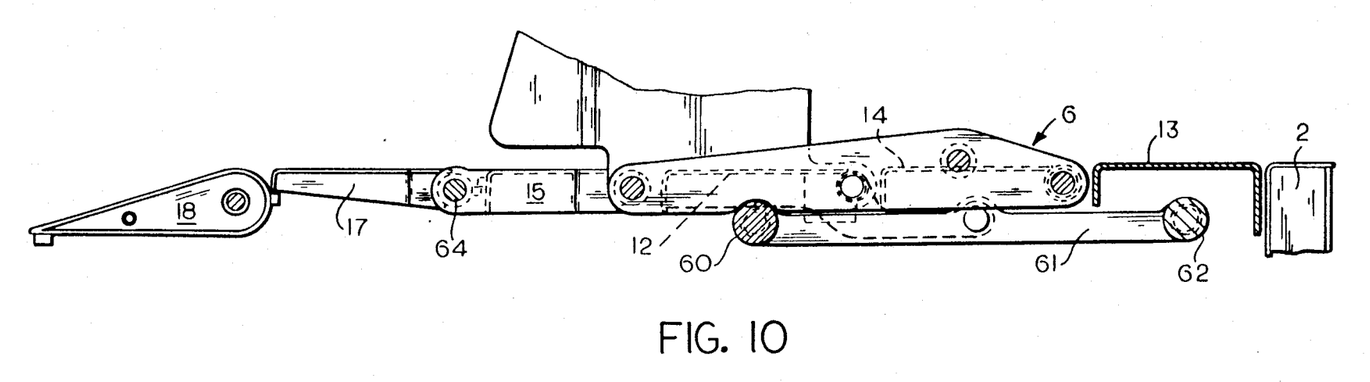
FIG. 10 is an enlarged detailed side elevation of the platform in its lowermost position at ground level with the safety barrier in its downward or ramp-like position taken along line 10—10 of FIG. 11.
Figure 11:
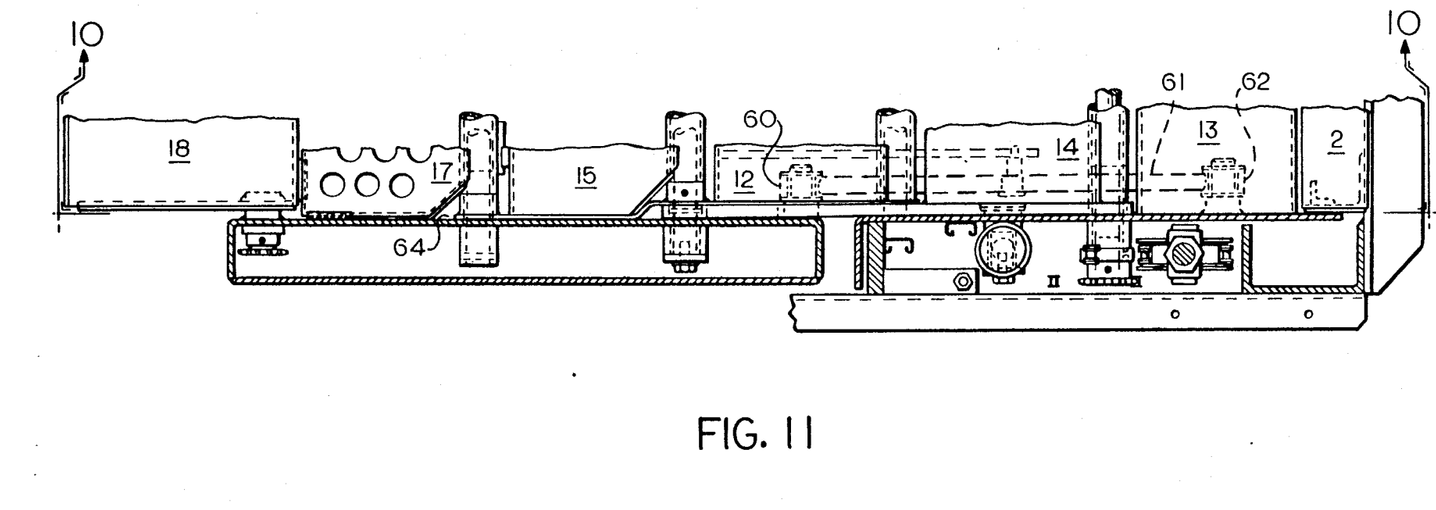
FIG. 11 is a fragmentary top plan view of the portions of the platform and safety barrier.

In FIG. 9, the safety barrier is pivoted at each end on bearings 19 and 20 and a stub axle extending through the bearing 20 carries a drive pulley 21 which in turn drives a timing or position sensing belt 22 past proximity switches L which signal to a controller the movement of the safety barrier 18 from its vertical barrier position where roll-off the lower step 17 is permitted to its horizontal position when the entire lift is lowered. This detail can also be seen in FIG. 7.

FIG. 9 shows the locking mechanism for keeping the safety barrier in its upper position and generally includes a pair of rods 23 and 24 pivotally attached to a yoke 25 which is pivoted about an axis 26 and may be turned by movement of the solenoid 27. As will be apparent from FIG. 9, movement of the solenoid 27 to the left causes the yoke 25 to pivot clockwise around axis 26, thus withdrawing the rods 23 and 24 from their sockets 28 and 29 in the trapezoidal frame 55 on either side of the steplift. Withdrawal of the rods 23 and 24 permits the entire safety barrier 18 to pivot from its vertical position as shown in FIG. 4 clockwise to a horizontal position.

Referring again to FIG. 4, the platform is shown in its horizontal extended position but must be raised to the level of the bus floor F. This is accomplished by extension of the hydraulic cylinder and piston combination 30 and 31 which extends from and has its top secured to the uppermost top edge of the outer frame 32. The lower end of the piston 31 carries a pulley arrangement 34 at its lower end as also seen in FIG. 5. A flexible chain 35 has one end secured relative to the support frame 32 by a chain anchor 37. Chain 35 extends downwardly and around the pulley arrangement 34, extends upwardly and around fixed pulley 38, at the uppermost top edge of the frame 32, and extends downwardly and is secured to a bracket 51 which is located behind a movable sprocket 39. Both the bracket 51 and the axis of the movable sprocket 39 are secured relative to the bottom of inner frame 33. As the cylinder and piston combination 30 and the pulley 34 31 is extended and moves downwardly, the run of chain 35 is lengthened between its start at 37 and between downwardly moving pulley arrangement 34 and fixed pulley 38 so that necessarily the end of the movable sprocket at 39 is pulled upwardly to raise the platform to the bus floor level F. This is easily visualized in FIG. 6.

Referring again to FIG. 4, a second chain 36 has its upper end secured by a chain anchor 38a. The second chain 36 extends downwardly and around movable sprocket 39, extends upwardly and around a fixed sprocket 40, and extends downwardly and is secured at a chain anchor 44 secured relative to the support frame 32. A shaft, which journals the movable sprocket 39, extends laterally across the platform to an identical sprocket and chain arrangement on the other side of the platform. The second chain 36 is a guide chain which merely keeps the sides of the platform level and moving at the same time because the movable sprocket 39 and its corresponding member on the other side are secured on the same axis so that movement of one necessarily is coordinated with movement of the other. As can be seen in FIGS. 4, 5 and 6, the inner frame 33 is guided for vertical reciprocation within the main support frame 32 by suitable slide members 41 and guide bars 42 and 43, and the fixed sprocket 40 is secured to the inner frame 33 for movement up and down with that inner frame 33.

To move the horizontal platform from its upper position shown in FIG. 5 to its lower position at ground or street level as shown in FIG. 6, the inner frame 33 is translated vertically in a downward direction as guided by the guide bars 42 and 43 and slide members 41 relative to the main frame 32. This downward movement is initiated by retraction of the piston 31 into its cylinder 30 which in turn moves the pulley arrangement 34 upwardly, thus shortening the run of the chain 35 between its fixed end at 37, the movable pulley 34, and the fixed upper pulley 38. As the movable pulley 34 moves upwardly and the run of the chain 35 is shortened, the other end of chain 35 secured at bracket 51 is pulled downwardly, thus lowering the end of the chain 35. As this end of the chain 35 is lowered, the entire horizontal platform and inner frame 33 moves downwardly towards its position as shown in FIG. 6. When the piston 31 is completely retracted within its cylinder 30, as shown in FIG. 6, the platform is resting at the ground line in its horizontal position with the barrier 18 still in its vertical erected position. The next step in the operating sequence is to lower the safety barrier 18 to its horizontal ramp position.

Referring to FIG. 9, the safety barrier 18 when actuated, is unlocked by the inward movement of the rods 23 and 24, as previously described, and then rotated around its axis at point Y by movement of a drive train separately provided for raising and lowering the safety barrier 18. This drive train is shown in detail in FIG. 8. Referring to that figure, a driven sprocket 49 secured to the stub axle extending through the bearing 19 is connected by a chain 45 which extends around a drive sprocket 46 which is secured to and coaxial with a gear sector 47. The external teeth of the gear sector 47 are meshed with a drive gear 48 directly connected to an electrical drive motor 50 which, as can be seen from this figure, when actuated, causes the gear sector 47 to be slowly rotated in counterclockwise fashion to turn the chain 45 and the sprocket 49 secured on the barrier axis so that the safety barrier 18 rotates on the stub axles in bearings 19 and 20 on each side of the safety barrier 18.

Figure 7:
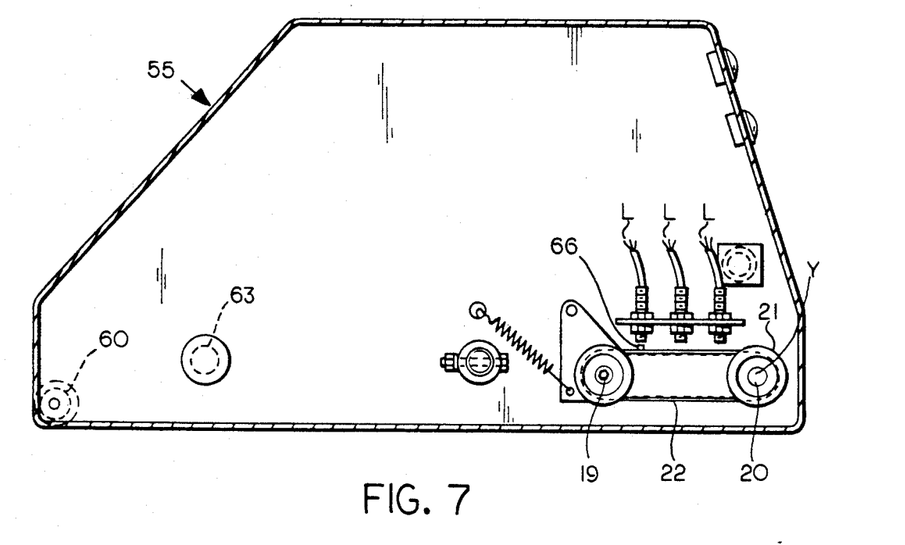
FIG. 7 is a detailed side elevation view taken along line 7—7 of FIG. 2 and illustrating the control mechanism for the safety barrier.
Figure 8:
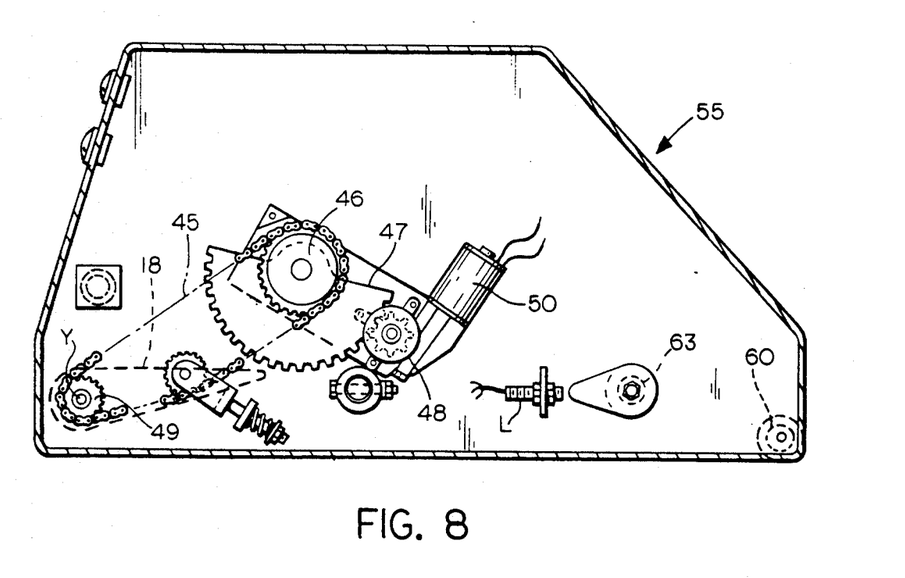
FIG. 8 is a detailed side elevation taken along line 8—8 of FIG. 2 similar to that of FIG. 7 and illustrating the drive train and locking mechanism of the safety barrier.

The position of the barrier is sensed by a timing belt 22 which is shown in FIG. 7 and consists of a number of proximity switches L which are appropriately programmed to sense the safety barrier in its full open or fully closed position. The proximity switches L and their actuator target 66 on the timing belt 22 can be magnetic, capacitive, photo-optic or any other type of limit switches which have appropriate capacity to sense position.

After the passenger or mobility impaired person has exited the platform in its lowermost position as shown in FIG. 6, the reverse movement of the platform to its upper and then retracted position will be performed upon signal from the vehicle driver as briefly as follows. Referring to FIG. 6, the cylinder 30 and piston 31 are now extended to lengthen the effective run of the chain 35 as the pulley arrangement 34 is pushed downwardly. This causes the lower end of the chain 35 secured at bracket 51 at the bottom of the inner frame 33 to move upwardly, pulling the inner frame 33 and platform from its lowermost position shown in FIG. 6 to its partially elevated position shown in FIG. 4. When the horizontal platform has reached the intermediate position with the safety barrier 18 in its vertical safety position, as shown in FIG. 4, the platform may be retracted and formed into the steps for storage by extending the cylinder 10 and its piston 11 so that the link 6 pivots in a counterclockwise direction about the pivot point A. This causes link 61 to follow link 6 in pivoting in a counterclockwise direction. As these two links (61 and 6) pivot together in a counterclockwise direction, their lower ends 60 and 63 cause the trapezoidal frame 55 to translate downwardly and rearwardly. This movement of trapezoidal frame 55 causes the bottom end 64 of riser 15 to move in a downward and inward direction, thus pivoting the lower riser 15 in a counterclockwise direction about the upper pivot point relative to middle step 12 until the lower riser 15 reaches a vertical position.

This movement of the trapezoidal frame 55 also causes the middle step 12 to move downwardly and inwardly as it is pivoted in the middle of link 6. At the same time, the upper riser 14 is pivoted counterclockwise about pivot point A towards a vertical position. As the lower riser 15 pivots counterclockwise towards a vertical position, the lowermost step 17 resumes its original slightly inclined position shown in FIG. 3. The safety barrier 18 is then pivoted from its vertical safety position as shown in FIG. 4 clockwise to a horizontal step position.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

I claim:

1. A lift system for vehicular use which provides either a flight of retractable steps or a vertically movable horizontal elevator platform for conveying nonambulatory passengers between an upper position level with the floor of a vehicle and a lower position at the ground level thereof, said lift system comprising:

an outer frame secured relative to said vehicle and including a pair of spaced apart outer side panels on either side of a door opening of said vehicle, said outer frame extending generally from a lowermost vehicle frame member upwardly to a position above said vehicle floor to provide an upper generally horizontal outer frame member extending laterally in said vehicle from a point above a lateral edge of said floor to the outer edge of said vehicle, an inner frame including a pair of spaced apart inner side panels placed between said outer side panels and adapted for guided vertical movement between an upper position where an upper edge of said inner side panels is closely adjacent to said upper outer frame member through an intermediate position and a lower position, a retractable step system leading from the floor level of said vehicle laterally outwardly and downwardly to the outer edge of said vehicle, said step system including an innermost upper step extending horizontally and rigidly secured between the opposed inner side panels, an upper riser having its upper edge pivotally secured to an outer edge of said upper step, a middle step having its inner edge pivotally secured to a lower edge of said upper riser, a lower riser having its upper edge pivotally secured to an outer edge of said middle step, and a lower step having its inner edge pivotally secured to a lower edge of said lower riser, said steps and risers when pivoted to a horizontal position forming said horizontal elevator platform, means for extending said steps to said horizontal position, said extending means comprising:

at least one generally trapezoidal plate, a first reciprocating motor means having its upper end secured above and laterally outward of said upper step and its lower end pivotally secured to a first pivot link, said first pivot link having its lower end affixed to said trapezoidal plate, a second pivot link, said second pivot link extending parallel to said first pivot link, said second pivot link having its lower end affixed to said trapezoidal plate a fixed distance from said first link, a third pivot link, said third pivot link extending between the midpoints of said first and second pivot links and secured thereto at pivot points spaced apart by said fixed distance whereby said first and second pivot links may be swung from a vertical lowered position to an upper horizontal position while said first and second pivot links remain parallel to each other, said first pivot link having its upper end secured relative to said upper step whereby when said first reciprocating motor means is retracted, it causes said first pivot link to swing about its pivotal connection to said upper step, thereby causing said second pivot link to follow said first pivot link by swinging outwardly and upwardly, thereby causing said third pivot link and said trapezoidal plate to move upwardly and outwardly, thus causing outward and upward movement of said steps and risers.

2. The lift system of claim 1 which further includes a second reciprocating motor means having its upper end secured to the upper portion of said outer frame and the lower end secured relative to said reciprocating trapezoidal plate and horizontal platform whereby movement of said second motor means between its extended and retracted positions will cause the initial raising and lowering of said trapezoidal plates and said horizontal platform between its upper position level with the bus floor through an intermediate position to a lower position at ground level.

3. The lift system of claim 2 which further includes a safety barrier pivoted at its lower edge within said trapezoidal plates and extending therebetween, said safety barrier extending generally across said lowermost step and movable from a vertical position at which roll-off at the bottom step is blocked to its forward horizontal position at which roll-off is permitted.

4. The lift system including the barrier of claim 3 wherein said barrier is locked in its upper vertical position by a pair of rods extending laterally outwardly from said barrier body and into corresponding sockets in the trapezoidal frame on each side of the step lift.

5. A lift system for vehicular use which provides either a flight of retractable steps of a vertically movable horizontal elevator platform for conveying nonambulatory passengers between an upper position level with the floor of a vehicle and a lower position at the ground level thereof, said lift system comprising:

an outer frame secured relative to said vehicle and defining a space within which said lift operates, said outer frame extending generally from a lowermost vehicle frame member upwardly to a position above said vehicle floor to provide an upper generally horizontal fixed frame member extending laterally in said vehicle, an inner frame including an pair of spaced apart inner side panels placed within said fixed outer frame and guided for vertical movement within said fixed outer frame between an upper position, an intermediate position and a lower position, a retractable step system leading from the floor level of said vehicle laterally outwardly and downwardly to the outer edge of said vehicle, said step system including an upper step extending horizontally between the opposed inner side panels, a riser having its upper edge pivotally secured to the outer edge of said upper step, and at least one additional lower step having its inner edge pivotally secured to a lower edge of said riser, said steps and risers when pivoted to a horizontal position forming said horizontal elevator platform, and means for extending said steps to said horizontal position, said extending means comprising:

a pair of opposed side plates bracketing said steps and risers, reciprocating motor means having its upper end secured above and laterally outward of said upper step and its lower end pivotally secured to a first pivot link, said first pivot link having its lower end affixed to said side plate, a second pivot link, said second pivot link extending parallel to said first pivot link, said second pivot link having its lower end affixed to said side plate a fixed distance from said first link, a third pivot link, said third pivot link extending between the midpoints of said first and second pivot links and secured thereto at pivot points spaced apart by said fixed distance whereby said first and second pivot links may be swung from a vertical lowered position to an upper horizontal position while said first and second pivot links remain parallel to each other, said first pivot link having its upper end secured relative to said upper step whereby when said motor means is retracted, it causes said first pivot link to swing about its pivotal connection to said upper step, thereby causing said second pivot link to follow said first pivot link by swinging outwardly and upwardly, thereby causing said third pivot link and said side plates to move upwardly and outwardly, thus causing outward and upward movement of said steps and risers to their horizontal platform position.

* * * * *